United States Patent [19]

Bugden et al.

[11] Patent Number: 4,772,293

[45] Date of Patent: Sep. 20, 1988

[54] MANUFACTURE OF ELECTROCHEMICAL CELLS

[75] Inventors: Walter G. Bugden, Wollaton; Peter R. Smith, Sherwood, both of England

[73] Assignee: Lilliwyte Societe Anonyme, Luxembourg, Luxembourg

[21] Appl. No.: 40,925

[22] Filed: Apr. 21, 1987

[30] Foreign Application Priority Data

Apr. 22, 1986 [GB] United Kingdom ................. 8609771

[51] Int. Cl.$^4$ ....................... H01M 2/00; B23K 31/02
[52] U.S. Cl. .................................... 29/623.1; 429/104; 228/179
[58] Field of Search ............................ 29/623.2, 623.1; 429/104, 176; 228/179, 122, 106, 20, 901, 903

[56] References Cited

U.S. PATENT DOCUMENTS

| | | | |
|---|---|---|---|
| 3,296,692 | 1/1967 | Griffin | 228/179 |
| 4,037,027 | 7/1977 | Desplanches et al. | 429/104 |
| 4,050,956 | 9/1977 | de Bruin et al. | 228/122 |
| 4,236,661 | 12/1980 | Dunn et al. | 228/184 |
| 4,245,012 | 1/1981 | Mikkor | 429/104 |
| 4,246,325 | 1/1981 | Hatch | 429/104 X |
| 4,419,418 | 12/1983 | Knodler et al. | 429/104 |
| 4,510,217 | 4/1985 | Kagawa et al. | 429/104 |
| 4,530,151 | 7/1985 | Kagawa et al. | 429/104 X |
| 4,638,555 | 1/1987 | MacLachlan et al. | 429/104 X |

FOREIGN PATENT DOCUMENTS 1352775  5/1974  United Kingdom.

OTHER PUBLICATIONS

J. T. Klomp, "Solid State Bonding of Metals to Ceramics", Phillips Research Laboratories, N.V. Phillips' Gloeilapenfabriken, Eindhoven, Netherlands, 501–522.

J. L. Sudworth and A. R. Tilley, "The Sodium Sulphur Battery" (1985), at 260–283.

M. G. Nicholas, "Diffusion Bonding Ceramics with Ductile Metal Interlayers", Brazing and Soldering, No. 10, (1986) pp. 11–13.

C. A. Calow and I. T. Porter, "The Solid State Bonding of Nickel to Alumina", 6 Journal of Materials Science, 156–163, (1971).

J. T. Klomp, "Interfacial Reactions Between Metals and Oxides During Sealing", 59 Ceramic Bulletin, No. 6 (1980), 794–799 & 802.

F. P. Bailey and W. E. Borbidge, "Solid State Metal–Ceramic Reaction Bonding", 14 Materials Science Research, 525–533 (1981).

Primary Examiner—Anthony Skapars
Attorney, Agent, or Firm—Arnold, White & Durkee

[57] ABSTRACT

The invention provides a method of manufacturing an electrochemical cell housing wherein a beta-alumina tube has an open end attached to a casing via an alpha-alumina ring. In the method the alpha-alumina ring is thermocompression bonded to a metal ring by hot isostatic pressing, the alpha-alumina ring is then glass welded to the open end of the tube, and the metal ring is metal welded to the casing. The invention also provides a cell housing wherein a beta-alumina tube is located in spaced relationship within a metal casing. The tube is glass welded to an alpha-alumina ring which is thermocompression bonded on a curved radially facing surface thereof to a metal ring, the metal ring being metal welded to the casing.

12 Claims, 2 Drawing Sheets

MANUFACTURE OF ELECTROCHEMICAL CELLS

This invention relates to an electrochemical cell housing. More particularly, the invention relates to a method of manufacturing an electrochemical cell housing, and to an electrochemical cell housing which can be manufactured according to the method.

According to one aspect of the invention, in the manufacture of an electrochemical cell housing comprising a beta-alumina tube located within an outer metal casing wherein the tube has an open end and is attached to the casing via an annular alpha-alumina ring at said open end, there is provided the method which includes the step of thermocompression bonding the alpha-alumina ring to at least one metal ring by hot isostatic pressing, and of thereafter attaching the alpha-alumina ring to the open end of the beta-alumina tube by glass welding and attaching at least one said metal ring by metal welding to the casing or to a metallic closure for the tube.

The term "glass welding" as used herein, is also known in the art as glass sealing or glassing.

The hot isostatic pressing of each metal ring to the alpha-alumina ring will be at a temperature and pressure sufficient to cause the thermocompression bonding. The metal employed for the metal rings will naturally be compatible in the intended cell environment with the intended active cell substances. For example, when the cell is intended to have, as active anode or cathode substances, substances such as the alkali metals or alkaline earth metals, chalcogens (e.g. sulphur or selenium) and electrolytes such as alkali metal or alkaline earth metal halides or haloaluminates, the metal of the rings may comprise nickel or a nickel-based or nickel-containing alloy, or a ferrous alloy, such as Inconel, Nilo K or Fecralloy. Possible thermal shock arising from differential thermal expansion between the alpha-alumina and the metal in question should also be borne in mind in selecting the metal to be used, and the aforesaid metals are believed to be suitable from the point of view of avoiding thermal shock.

For thermocompression bonding such metals to alpha-alumina with a reasonably short heating regime or cycle time, temperatures in excess of 1000° C. are typically required, with the alpha-alumina and metal being held together by the hot isostatic pressing with considerable force. The isostatic pressing step of the present invention may thus take place at a temperature in the range 1000°–1400° C., preferably 1050°–1250° C. and typically 1100° C., the alpha-alumina and metal being pressed together by pressures in the order of 50–200 MPa, preferably 10–50 mPa and typically 25 mPa, for cycle times of the order of 15–120 minutes, preferably 30–80 minutes, and typically 60 minutes, for the aforesaid nickel- or iron-containing metals. For example, for nickel, a temperature of 1050° C. and a pressure of 50 MPa, applied by way of hot isostatic pressing is suitable, for a cycle time of 60 minutes. Heating rates from ambient up to the maximum temperature of up to 1000° C./hr or more may be employed, such heating rates conveniently being in the range of 500°–700° C./hr, typically 600° C./hr. Similar cooling rates may be employed.

Two metal rings may be attached to the alpha-alumina ring by the hot isostatic pressing to form a collar assembly, to which the beta-alumina tube is then attached by glass welding, which is also known as glassing. Typically beta-alumina tubes are closed at one end, so that such collar will usually be attached only to one end thereof in the manufacture of the cell housing.

The rim or periphery of the open end of the beta-alumina tube may be welded by means of glass into an axially outwardly facing groove, provided for this purpose, on the alpha-alumina ring, the groove extending circumferentially along an axially facing side of the ring and coaxial with the ring. Furthermore, two concentric rings of metal may be attached to the alpha-alumina ring prior to the glass welding, concentric with the alpha-alumina ring, the metal rings being preferably attached respectively to the inner and outer curved cylindrical surfaces of the alpha-alumina ring and being in the form of truncated cylinders which may project from the alpha-alumina ring in the axial direction opposite to the axial direction in which the annular groove in the alpha-alumina ring faces. The cell housing can then be completed by attaching a metal closure, e.g. in the form of a circular or annular disc, to the inner metal ring to close off the tube, and by attaching a metal closure, which may also be in the form of an annular disc, to the outer metal ring, to close off an annular opening in the cell housing defined between the beta-alumina tube and an outer metal casing, which may be in the form of a canister, in which the tube is located, the casing being attached to the outer periphery of said closure. Attachment of the closures to the metal rings will be by welding, conveniently tungsten inert gas welding, said closures and casing being, for example, nickel, nickel alloys, steel or the like.

In a particular embodiment of the invention, the method may accordingly include simultaneously thermocompression bonding two metal rings to the alpha-alumina ring by hot isostatic pressing, one to the radially inner side of the alpha-alumina ring and one to the radially outer side thereof, the method including metal welding the radially inner ring to a metal closure to close off said open end of the tube and metal welding the radially outer outer ring to the casing, and the method further including forming a circumferentially extending axially facing groove in the alpha-alumina ring between the metal rings, locating the open end of the beta-alumina tube in said groove, and glass welding said open end in position in said groove. As mentioned above, the outer metal ring can be attached to the casing indirectly, by welding an annular metal closure between the outer ring and the casing or canister, or said outer ring can be welded directly to the casing or canister.

The method may include, as a preliminary step, the formation of the collar assembly comprising the alpha-alumina ring with the two metal rings concentrically attached thereto as described above, and a plurality of such assemblies may be formed simultaneously. According to this aspect of the invention a plurality of alpha-alumina tubes each thermocompression bonded to two metal rings, may simultaneously be formed prior to the glass welding thereof to beta-alumina tubes, by locating an alpha-alumina ring concentrically between a pair of metal tubes, thermocompression bonding the metal tubes simultaneously to the alpha-alumina ring by hot isostatic pressing to form a composite assembly, and then slicing the composite assembly into a plurality of annular slices, each of which slices comprises an alpha-alumina ring thermocompression bonded to two metal rings. In this case, the alpha-alumina ring may be a composite tube, being formed by stacking a plurality of alpha-alumina tubes end-to-end, the slicing being into slices which each comprise a pair of alpha-alumina tubes located between a pair of metal rings, one of the alpha-alumina tubes being removed and discarded before the slice is attached to the beta-alumina tube and casing. In other words, a plurality of alpha-alumina tubes may be pre-formed individually, being then assembled together to form a composite or segmented tube which is sandwiched concentrically between two tubes of metal from which the metal rings are to be sliced.

The annular space between the metal tubes which is occupied by the alpha-alumina ring may be evacuated of gas prior to the thermocompression bonding, opposite ends of the annular space occupied by the alpha-alumina ring being closed off by welding annular closures to the ends of the metal tubes to seal said annular space under a vacuum prior to said thermocompression bonding.

The method may in this case include the step of loading a getter material into the interior of said annular space prior to the sealing, the getter material acting to resist a pressure build-up in said annular space during the thermocompression bonding by gettering at least some of such gases as are evolved in said interior during the hot isostatic pressing.

Thus, the annular open ends of the annular space between the pipes may be closed off by annular closure discs suitably welded thereto, eg by tungsten inert gas welding, the final weld being by electron beam welding under vacuum, after which the assembly as a whole will be subjected to the hot isostatic pressing. Electron beam welding is preferred for the final weld as the interior of the assembly should be evacuated of gas before the hot isostatic pressing, and electron beam welding can be effected under vacuum. The initial welds however may take place under inert gas.

Instead, all the welds may be effected by tungsten inert gas welding, one of the metal tubes or one of the closures being provided with a bleed opening or passage, via which the assembly may be evacuated before the hot isostatic pressing, the bleed opening or passage being suitably sealed off prior to the hot isostatic pressing.

Providing slices as described above which each contain two alpha-alumina tubes, permits, upon removal of one of these rings, a collar to be obtained wherein the metal rings project axially to one side of the remaining alpha-alumina ring in the collar, to facilitate subsequent metal welding of these metal rings to the beta-alumina tube closure and to the casing. Removal of the one alpha-alumina ring may be by machining or grinding, which can also be employed to provide the groove in the remaining beta-alumina ring for receiving the open end of the beta-alumina tube. Instead, however, both alpha-alumina tubes may be left in the collar, and welding of the metal rings to the beta-alumina tube closure and to the casing may be effected alongside one of these alpha-alumina tubes, any damage caused to this alpha-alumina ring by the welding being prevented from extending or propagating into the other alpha-alumina ring which will remain whole and undamaged and suitable for sealing the end of the beta-alumina tube.

Naturally, if desired, the radially inner and outer curved surfaces of the alpha-alumina tubes from which the composite tube is formed may be ground and/or polished to a desired degree of smoothness prior to the hot isostatic pressing, to promote good thermocompression bonding, adhesion and sealing of the metal tubes to the alpha-alumina ring. This grinding and polishing may be effected by means of a suitable abrasive paper and/or diamond paste.

The method may further include the step of providing, on each metal surface which is to be thermocompression bonded to alpha-alumina by the hot isostatic pressing, a continuous coating of a different metal. In a particular case the metal surface maybe a nickel surface, the coating being at most 2 microns thick and the different metal being a member of the group comprising platinum, gold and copper. The different metal may be applied by any suitable method, e.g. electrolysis, vapour phase deposition or sputtering.

Instead, the method may include the step of forming on each metal surface which is to be thermocompression bonded to alpha-alumina by the hot isostatic pressing, a layer of oxide of the metal less than 1 micron thick. Forming the oxide layer may be by heating the metal at an elevated temperature in an oxidizing atmosphere. The heating may be at a temperature of at least 250° C., in air. In this case also, the metal may be nickel.

The oxidizing will usually be at a temperature above 250° C. and, naturally, below the melting point of the metal. Preferably this temperature is about 300°–500° C. The period for which the metal is held at the elevated temperature in the oxidizing atmosphere is inversely related to the temperature, being longer when the temperature is lower and vice versa. This period can vary from a few minutes or less at temperatures close to the melting point of the metal, and can extend typically up to about 2 hours or more for temperatures of about 250° C.

As is the case with the hot isostatic pressing, where longer cycle times are typically employed for lower hot isostatic pressing temperatures and pressures, than are employed for higher pressing temperatures and pressures; and higher isostatic pressing pressures are employed at lower pressing temperatures than at higher pressing temperatures, the best, most convenient or most economic combination of parameters to be used for formation of the layer of oxide should be determined by routine experimentation, within the ranges specified above.

The purpose of the metal coating or oxide layer is to improve the thermocompression bonding, thereby increasing the bond strength and gas-tightness thereof. For thermocompression bonding nickel to alpha-alumina, good results have been obtained for heating nickel in air at 360° C. for 1 hour, being better than the results obtained when nickel is heated for e.g. 15 minutes at 900° C. in air. In these cases, when the hot isostatic pressing took place at 50 mPa at 1150° C. for 30 minutes, bond strengths were obtained for the samples oxidized at 360° C. of about 32 mPa, compared with about 17.5 mPa for those oxidized in air at 900° C.

The invention extends also to an electrochemical cell housing which comprises a beta-alumina tube located within a metal casing and defining a space therebetween, the interior of the tube and the space between the casing and tube respectively providing electrode compartments, the tube having an open end glass welded to an alpha-alumina ring and the alpha-alumina ring having at least one annular metal ring thermocompression bonded to a curved radially directed surface thereof, the metal ring being metal welded to the casing or to a metal closure which closes the tube.

There may be two metal rings thermocompression bonded to the alpha-alumina, namely a radially inner metal ring bonded to the radially inwardly directed curved surface of the alpha-alumina ring and a radially outer metal ring bonded to the radially outwardly directed curved surface of the alpha-alumina ring, the radially inner metal ring being metal welded to a metal closure which closes the tube and the radially outer metal ring being metal welded to the casing.

Naturally, these housings may be made in accordance with the method of manufacture described above.

The invention will now be described, by way of example, with reference to the accompanying diagrammatic drawings, in which.

Figure 1:
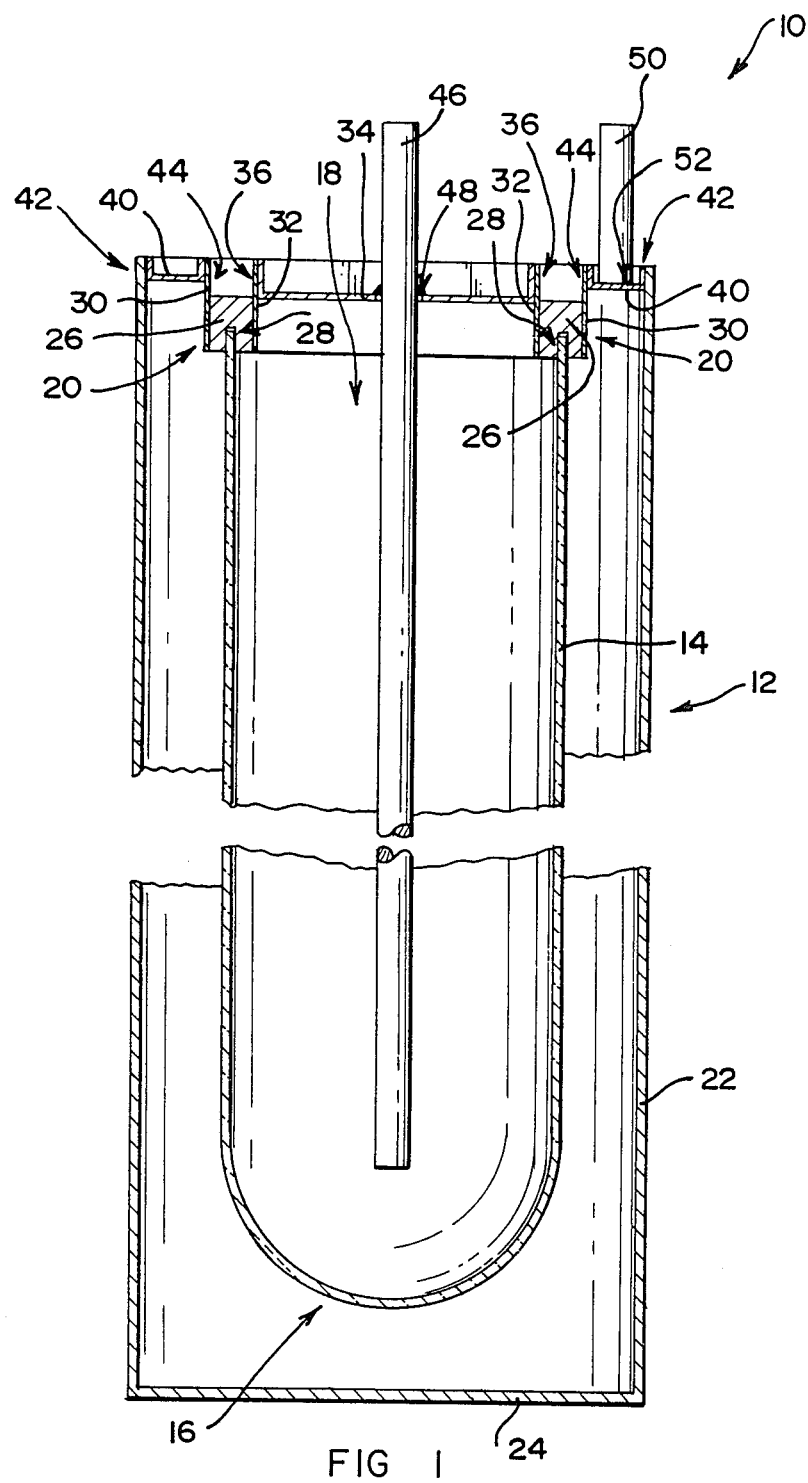
FIG. 1 shows a schematic sectional side elevation of a cell housing made in accordance with the method of the present invention.

In FIG. 1 of the drawings, reference numeral 10 generally designates a cell housing manufactured in accordance with the method of the present invention. The housing is suitable, for example, for an electrochemical cell which has molten sodium as its active anode material, a transition metal chloride such as $FeCl_2$ or $NiCl_2$ in the form of a porous matrix as its active cathode material, and a molten salt liquid electrolyte comprising sodium aluminium chloride, the active anode material on the one hand, and the molten salt electrolyte and active cathode material on the other hand, being provided on opposite sides of a beta-alumina separator which acts as a solid electrolyte.

The housing 10 comprises an outer cylindrical casing 12 in the form of a canister, e.g. of nickel or preferably steel and, concentrically located therein, an beta-alumina ring 14, closed at one end at 16 and open at its other end at 18. The periphery of the open end 18 of the tube 14 is provided with a collar assembly, generally designated 20. The tube 14 forms the solid electrolyte of the eventual cell.

The casing 12 has a cylindrical side wall 22 welded to a circular floor 24, the closed end 16 of the tube 14 being located adjacent but spaced from the floor 24.

The collar 20 comprises a circular ring or truncated cylinder 26 of alpha-alumina, the axially inner end face of which has a circumferentially extending groove therein at 28, within which the periphery of the open end 18 of the tube 14 is located and is welded, in fluid-tight fashion, by means of glass. Two concentric truncated cylinders of nickel, designated 30 and 32, are thermocompression bonded in fluid-tight fashion respectively to the outer and inner curved surfaces of the ring 26. The open end 18 of the tube 14 is closed off by an annular closure disc 34 of nickel or stainless steel, welded to the ring 32 at 36 by tungsten inert gas welding; and the end of the casing 12 remote from the floor 24 is closed off by means of an annular closure disc 40 of nickel or stainless steel, welded to the casing at 42 and welded to the ring 30 at 44 by tungsten inert gas welding. A stainless steel rod current collector 46 is shown projecting into the tube 14 via the disc 34, to which it is similarly welded as at 48, and a stainless steel rod current collector 50 is shown welded to the axially outer surface of the disc 40 at 52. This arrangement is suitable for a cell in which the anode material is located inside the tube 14, the cathode material and molten salt electrolyte being located in the annular space between the tube 14 and casing 12.

Figure 2:
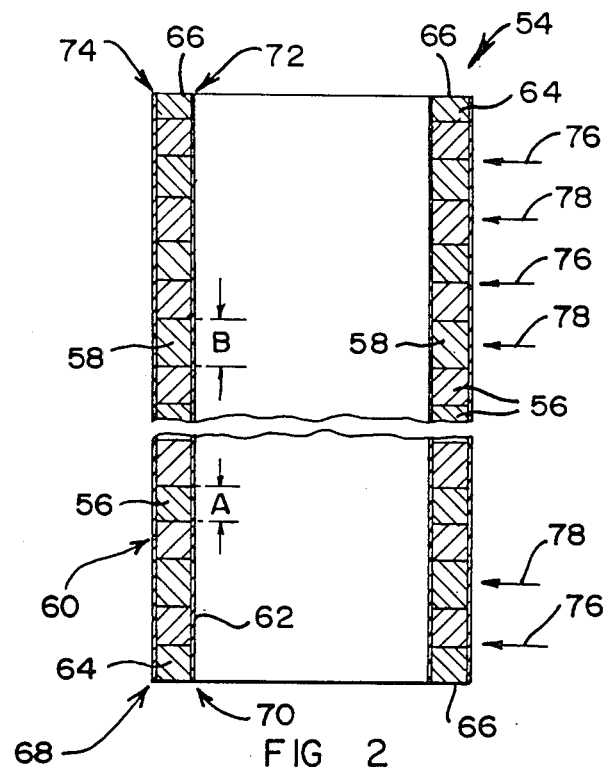
FIG. 2 shows a schematic sectional side elevation of a composite assembly of nickel tubes and an alpha-alumina ring formed from alpha-alumina tubes prior to hot isostatic pressing.

Turning to FIG. 2, reference numeral 54 generally designates an assembly for the mass production of collar assemblies 20 (FIG. 1) in accordance with the method of the invention. The assembly 54 comprises a plurality of alpha-alumina tubes 56, 58 which have been formed from alpha-alumina and, after such grinding or polishing as is required for their outer and inner curved surfaces, have been stacked in end-to-end abutment concentrically between two nickel pipes 60, 62, fitting between said pipes with a close sliding or friction fit. It will be noted that the rings 58 are somewhat longer (see B in FIG. 2) in the axial direction than the rings 56 (see A in FIG. 2) and that a pair of rings 56 is located between successive rings 58. The rings at the end of the stack, designated 64, are half the axial length of the rings 58.

To complete the manufacture of the assembly 54, annular closure discs 66 are welded to the pipes 60, 62 at 68, 70, 72 and 74, to close off the annular space between the pipes 60 and 62, within which the rings 56, 58 and 64 are located. Three of these welds, e.g. 68, 70 and 72 are tungsten inert gas welds which are formed first, after which the annular space between the pipes 60, 62 is evacuated, e.g. by locating the assembly in a vacuum chamber, wherein the final weld 74 is made by electron beam welding, so that the assembly 54 is closed with a vacuum therein. Some titanium or tantalum, e.g. in the form of granules or foil 65 may be provided in the interior of the assembly 54 for the purpose of gettering gases such as oxygen given off by the hot isostatic pressing described hereunder.

The assembly 54, or a plurality of such assemblies simultaneously, is/are then subjected to hot isostatic pressing at a temperature of 1050° C. for 60 minutes under a fluid pressure of 50 MPa, to thermocompression bond the pipes 60, 62 respectively to the outer and inner curved surfaces of rings 56, 58, 64. After cooling, the assembly 54 is then sliced or cut into rings, at the positions shown by the arrows 76, 78, the cuts at 76 being between two abutting alpha-alumina tubes 56, and the cuts at 78 being midway, lengthwise, along each of the alpha-alumina tubes 58. Before or after this cutting the closure discs 66 can be removed; or the cut end portions having the discs 66 can be discarded.

Figure 3:
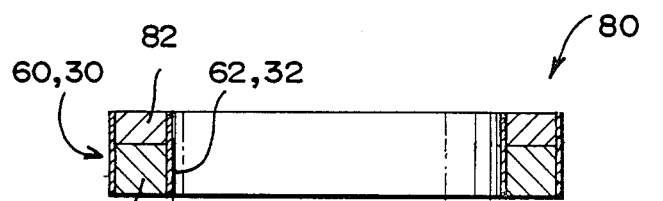
FIGS. 3 to 5 show similar views of a collar assembly made from the assembly of FIG. 2, in successive stages of manufacture.

This cutting at 76, 78 produces a plurality of annular collar assembly blanks, one of which is shown at 80 in FIG. 3. The blank 80 comprises a ring 56 of alpha-alumina (designated also 26 as it will form the ring 26 of the collar assembly 20 of FIG. 1), a ring 82 of alpha-alumina which is half of one of the rings 58 of FIG. 2, and two rings 60, 62 of nickel (also designated 30, 32 as they will form the rings 30, 32 of the assembly 20 of FIG. 1).

Figure 4:
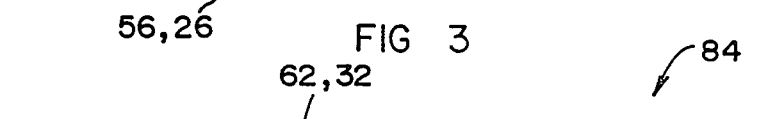
Figure 5:
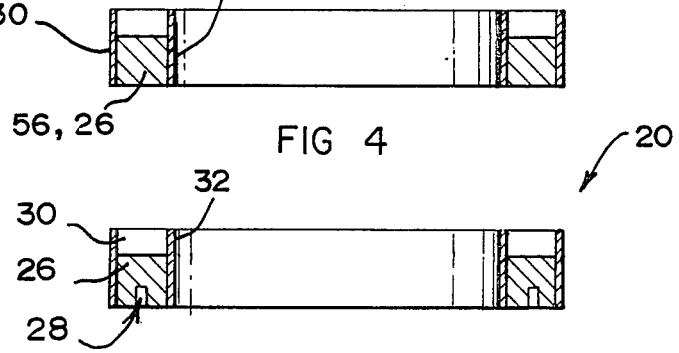

The ring 82 is then machined out of the blank 80 to provide a part-processed blank as shown at 84 in FIG. 4, in which the same numerals refer to the same parts as in FIG. 3; and diamond grinding is them employed to form the groove at 28 (FIG. 5) for receiving the periphery of the open end 18 of the tube 14 (FIG. 1). The finished collar assembly is shown in FIG. 5 where the parts are designated by the numerals used in FIG. 1.

With reference also to FIG. 1, the tube 14 is then glass welded at its open end 18 into the groove at 28 in the ring 26, and, after sodium is charged into the tube 14, the disc 40 (having the current collector 46 prewelded thereto at 48) is titanium inert gas welded to the nickel ring 32 at 36. The tube 14 is then located concentrically within the casing 12, molten salt electrolyte is charged into the annular space therebetween together with porous active cathode material, and the cell housing is completed by tungsten inert gas welding the disc 40 to the nickel ring 30 at 44 and to the casing 12 at 42.

Employing hot isostatic pressing to thermocompression bond the nickel rings 30, 32 to the alpha-alumina ring 26 has a number of material and unexpected advantages. An important advantage is that machining and preparation of the rings, particularly the alpha-alumina ring, can be kept to a minimum. This arises from the fact that isostatic pressing, as opposed for example to uniaxial pressing or die pressing, exerts its pressure in all directions, so that close tolerances and a close surface-to-surface fit between the nickel rings and the alpha-alumina ring, with the rings preferably seating flat and in continuous surface-to-surface contact with each other is less important. Relatively poor fits or contact between the rings to be thermocompression bonded can in principle be tolerated, the isostatic pressing automatically bringing the materials to be thermocompression bonded into contact with each other, and spreading them out and bending them into contact, if necessary, before the thermocompression bonding actually takes place. A high degree of surface finish, and finishing and machining of the components prior to the thermocompression bonding can thus be substantially reduced, if not eliminated. This is of major importance in keeping costs to a minimum.

A further material advantage of the invention is that the employment of hot isostatic pressing permits the nickel rings to be attached to the curved cylindrical inner and outer surfaces of the alpha-alumina ring. This is believed to be impossible, or at best extremely difficult, with die pressing or uniaxial pressing. Attaching the nickel rings to the curved inner and outer surfaces of the alpha-alumina ring allows the assembly of said three rings to be kept to a minimum in radial thickness, but, at the same time, relatively large curved surfaces, made large by their extending in the axial direction, can be employed for the thermocompression bonding, thus ensuring bonding over a large area, with the attendant advantages of mechanical strength, durability and fluid-tightness. This permits a cell to be made with an electrode compartment outside (or inside) the beta-alumina tube of extremely narrow radial dimensions, as the alpha-alumina ring need stand proud of the beta-alumina ring in the radially outward (or inward) direction by a spacing which is not larger than about half the width of the axially facing end face of the alpha-alumina ring, which in turn need be no wider than required for proper welding to the beta-alumina tube. In short, the alpha-alumina ring can be made of narrow radial dimensions, with the attendant advantages, i.e. narrow electrode compartments as described above, requiring reduced amounts of electrode or electrolyte material to fill them sufficiently to wet the beta-alumina tube fully.

In this regard it should be noted that good results have been obtained with 40 mm nominal diameter beta-alumina tubes, but less successful results have been obtained with 54 mm nominal diameter beta-alumina tubes. It is believed, however, that with better quality control the difficulties encountered with larger tubes will be overcome and, in any event as mentioned above, the invention has particular advantages when applied to narrow beta-alumina tubes.

A further material advantage of the present invention is that a large industrial scale isostatic pressing device or apparatus can be used, simultaneously to prepare large numbers of ring assemblies, according to the method described above. Cycle times are kept to a minimum, and to match these cycle times by uniaxial or die pressing, large numbers of dies, with the attendant extremely high cost, would be required.

Furthermore, with the particular geometry shown in FIG. 1 of the drawings, the nickel rings can project in the axial direction from the alpha-alumina ring, to provide relatively large surface areas for welding to the casing (via disc 40) and to the circular closure disc 34, thus promoting the easy formation of strong fluid-tight welds.

Also, if desired, it should be noted that the nickel tubes or pipes 60, 62 can have their surfaces which are to abut the alpha-alumina tubes 56, 58, 64 treated to improve the thermocompression bond strengths therebetween. Thus these tube surfaces can have an oxide layer formed thereon, e.g. by heating the tubes in air at 360° C. for 1 hour, or can be provided with e.g. a gold surface 1-2 microns thick by for example vapour phase deposition or sputtering. Furthermore, such surface treatment can act to improve the fluid tightness of the thermocompression bonds obtained. As regards the oxide layer, tests have shown that it need not be thick to improve the bond strength of nickel to alpha-alumina, and layer thicknesses which are not detectable by a weight increase on a four-figure chemical balance have been found to be effective.

The oxide layer, or alternatively the coating of a different metal such as, for example, gold, platinum or copper, as the case may be, is indicated, for example, in FIG. 3 by reference numerals 31 and 33.

Finally, it should be noted that the method of the invention can be applied by thermocompression bonding a metal ring to the outer curved surface of an alpha-alumina ring, followed by cutting an annular circumferentially extending slot in the metal ring, thereby dividing it into two axially spaced metal rings bonded to said curved surface and separated by said slot. These rings can then be welded, in the fashion of rings 30 and 32 in FIG. 1, to the tube closure 34 and casing 12, to form the housing.

We claim:

1. In the manufacture of an electrochemical cell housing comprising a beta-alumina tube located within an outer metal casing wherein the tube has an open end and is attached to the casing via an annular alpha-alumina ring at said open end, the alpha-alumina ring being hollow-cylindrical in shape and having a pair of flat end faces, a cylindrical radially inner curved surface and cylindrical outer curved surface, by a method which includes the step of thermocompression bonding the alpha-alumina ring to at least one metal ring, and of thereafter attaching the alpha-alumina ring to the open end of the beta-alumina tube by glass welding and attaching at least one said metal ring by metal welding to the casing or to a metal closure for the tube, the improvement whereby the thermocompression bonding is effected by hot isostatic pressing by means of a fluid under pressure, the pressure being exerted in a radial direction and the metal ring being bonded to one of the cylindrical curved surfaces of the alpha-alumina ring.

2. A method as claimed in claim 1, which includes simultaneously thermocompression bonding two metal rings to the alpha-alumina ring by said hot isostatic pressing in a radial direction, one to the radially inner cylindrical curved surface of the alpha-alumina ring and one to the radially outer cylindrical curved surface thereof, the method including metal welding the radially inner metal ring to a metal closure to close off said open end of the tube and metal welding the radially outer metal ring to the casing, and the method further including forming a circumferentially extending axially facing groove in the alpha-alumina ring between the metal rings, locating the open end of the beta-alumina tube in said groove, and glass welding said open end in position in said groove.

3. A method as claimed in claim 1, in which a plurality of alpha-alumina tubes are simultaneously each thermocompression bonded to two metal rings formed prior to the glass welding thereof to beta-alumina tubes, by locating an alpha-alumina ring concentrically between a pair of metal tubes, thermocompression bonding the metal tubes simultaneously to the alpha-alumina ring by hot isostatic pressing to form a composite assembly, and then slicing the composite assembly into a plurality of annular slices, each of which slices comprises an alpha-alumina ring thermocompression bonded to two metal rings.

4. A method as claimed in claim 3, in which the alpha-alumina ring is a composite tube and is formed by stacking a plurality of alpha-alumina tubes end-to-end, and in which the slicing is into slices which each comprise a pair of alpha-alumina tubes located between a pair of metal rings, one of the alpha-alumina tubes being removed and discarded before the slice is attached to the beta-alumina tube and casing.

5. A method as claimed in claim 3, in which the annular space between the metal tubes which is occupied by the alpha-alumina ring is evacuated of gas prior to the thermocompression bonding, opposite ends of the annular space occupied by the alpha-alumina ring being closed off by welding annular closures to the ends of the metal tubes to seal said annular space under a vacuum prior to said thermocompression bonding.

6. A method as claimed in claim 5, which includes the step of loading a getter material into the interior of said annular space prior to the sealing, the getter material acting to resist a pressure build-up in said annular space during the thermocompression bonding by gettering at least some of such gases as are evolved in said interior during the hot isostatic pressing.

7. A method as claimed in claim 1, which includes the step of providing, on each metal surface which is to be thermocompression bonded to alpha-alumina by the hot isostatic pressing, a continuous coating of a different metal.

8. A method as claimed in claim 7, in which the metal surface is a nickel surface, the coating is at most 2 microns thick and the different metal is a member of the group comprising platinum, gold and copper.

9. A method as claimed in claim 1, which includes the step of forming on each metal surface which is to be thermocompression bonded to alpha-alumina by the hot isostatic pressing, a layer of oxide of the metal less than 1 micron thick.

10. A method as claimed in claim 9, in which forming the oxide layer is by heating the metal at an elevated temperature in an oxidizing atmosphere.

11. A method as claimed in claim 10, in which the heating is at a temperature of at least 250° C. and is in air.

12. A method as claimed in claim 9, in which the metal is nickel.

* * * * *